INVENTOR.
ROBERT F. RASMUSSEN
BY Ronald T. Reiling
ATTORNEY

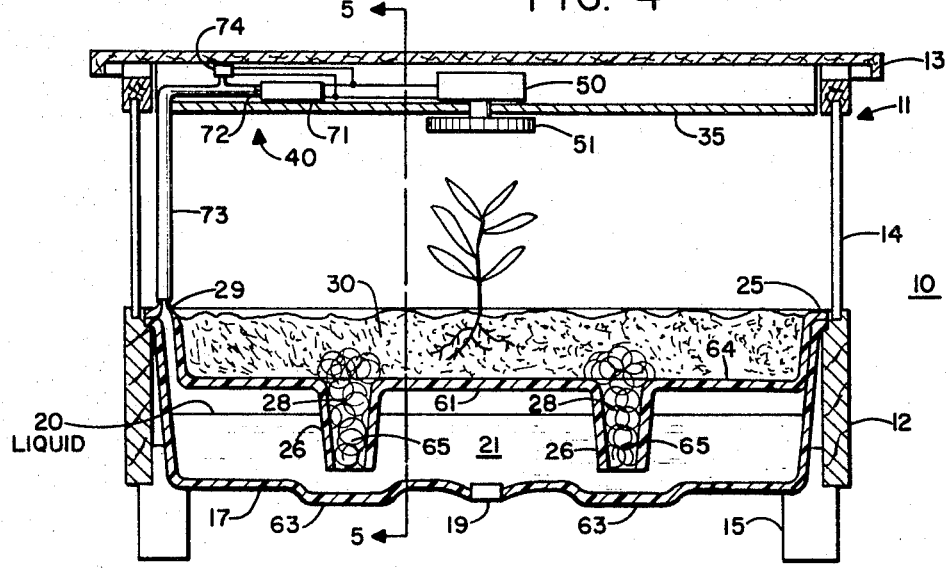

United States Patent Office 3,451,162
Patented June 24, 1969

3,451,162
HYDROPONIC APPARATUS
Robert F. Rasmussen, Brooklyn Center, Minn., assignor to The Technicraft Corporation, Minneapolis, Minn., a corporation of Minnesota
Continuation-in-part of application Ser. No. 509,043, Nov. 22, 1965. This application Feb. 14, 1967, Ser. No. 628,194
Int. Cl. A01g *31/00, 27/00*
U.S. Cl. 47—1.2    7 Claims

ABSTRACT OF THE DISCLOSURE

This application discloses a hydroponic apparatus for growing plants wherein the roots are periodically flooded with a nutrient solution. Radiation means are provided in the hydroponic apparatus. The plant's growing cycle is automatically controlled by controlling thie amount of the frequency of the nourishment and the radiation and the plant.

Cross-reference to related application

This application is a continuation-in-part of copending application Ser. No. 509,043, filed Nov. 22, 1965, and now abandoned.

Background of the invention

The applicant's invention pertains to plant husbandry and more particularly to hydroponic apparatus for controlling the growth cycle of plants.

There have been many prior art attempts to provide suitable hydroponic devices which are generally designed to provide large scale growing areas utilizing extremely complex systems. The prior art devices cannot be utilized indoors. The prior art devices do not provide inexpensive, compact, reliable and easily adjustable control means for controlling the growth cycle of plants therein. The prior art devices do not adequately isolate the electrical controls from the nutrient solution.

Summary

The applicant's invention comprises an improved hydroponic apparatus utilizing a unique structural configuration that provides a compact, inexpenesive and highly reliable device that is generally utilized indoors. Means are provided in the housing means for forming a nutrient solution storage chamber adapted to hold a nutrient solution. Pump means are provided in the housing to pump the nutrient solution from the storage chamber to the supporting means holding the roots of the plants positioned within the housing means. Radiation means may also be provided in the housing. Easily adjustable control means are provided to control the growth cycle of the plants by controlling the energization of the pump means and/or the radiation means. The applicant's apparatus is carefully designed to completely isolate all electrical elements from the nutrient solution.

Brief description of the device

FIGURE 4 is a cross sectional view of another embodiment of the applicant's hydroponic apparatus; and FIGURE 5 is a cross sectional view taken along section line 5—5 of FIGURE 4.

Description of the preferred embodiments

Figure 1:
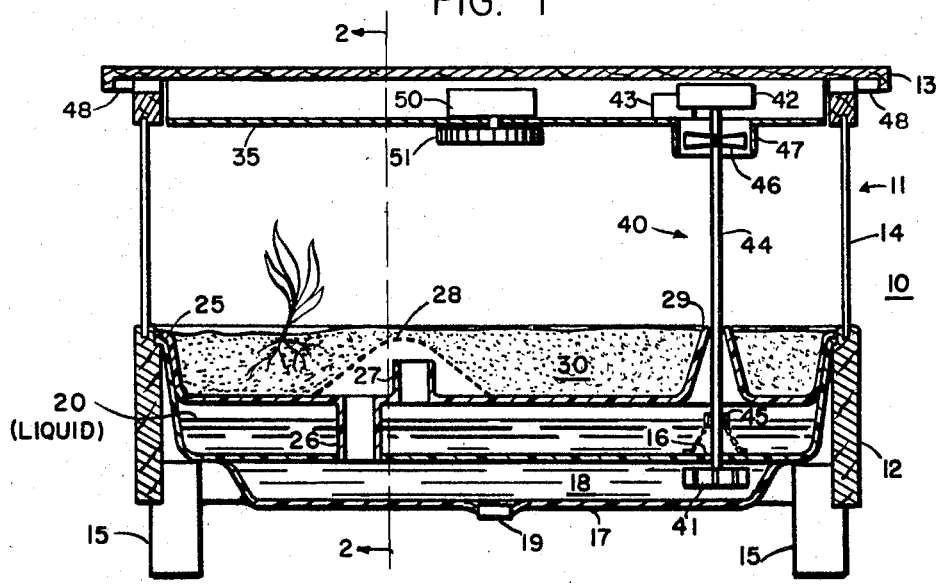
FIGURE 1 is a cross sectional view of one embodiment of the applicant's hydroponic apparatus.
Figure 2:
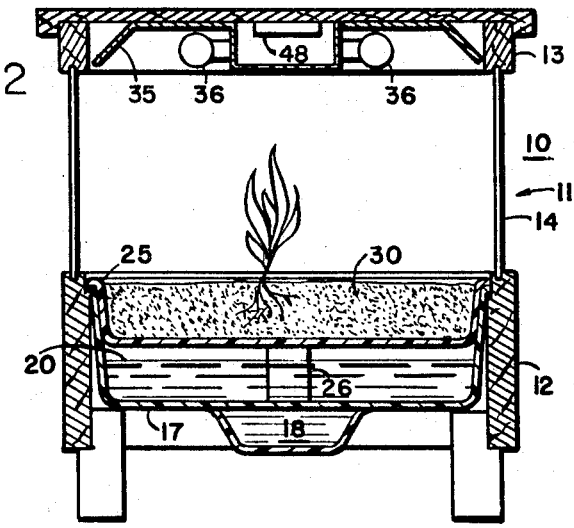
FIGURE 2 is a cross sectional view taken along section line 2—2 of FIGURE 1.

Referring now to FIGURES 1 and 2, reference numeral 10 generally depicts a hydroponic apparatus. Hydroponic apparatus 10 includes an enclosed housing means 11 comprising a wood base portion 12, a wood top portion 13, and a glass central portion 14. Legs 15 support housing means 11. Of course, housing means 11 need not be fabricated out of these particular materials.

A solution container 17 is positioned within base portion 12 of housing means 11. Solution container 17 has a channel 18 integral therewith. Channel 18 also functions as a structural member, similar to a box beam, to provide support to container 17. A drain 19 is provided in the bottom of solution container 17.

A growth tray or supporting means 25 is positioned within base portion 12 of housing means 11 and fits partially into solution container 17. The peripheral edges of growth tray 25 are in contact with solution container 17 and may be sealed thereto. However, the exterior surface of growth tray 25 is spaced apart from the interior surface of solution container 17. Thus, solution container 17 and growth tray 25 cooperate to form a nutrient storage chamber 21 therebetween. A standpipe or passageway 26 extends from growth tray 25 into chamber 21 and is spaced apart from the interior surface of solution container 17. Thus, standpipe 26 constitutes means for providing fluid communication between chamber 21 and the interior surface of growth tray or supporting means 25. An overflow tube 27 is also provided in growth tray 25, and is in fluid communication with chamber 21.

An inert material 30 substantially fills the interior surface of growth tray or support means 25. Inert material 30 is held away from standpipe 26 and overflow tube 27 by means of a screen 28. Alternatively, a filter material may be positioned in standpipe 26 and tube 27 to keep the inert material from chamber 21. An inlet passage 29 is provided for chamber 21. A nutrient solution 20 partially fills chamber 21.

A sheetmetal electrical assembly 35 is rigidly attached to top portion 13 of housing means 11. Electrical assembly 35 has a pair of radiation means 36 mounted thereon which may be fluorescent type lights which emit light of a desirable color spectra. Electrical assembly plate 35 also functions as a reflector for the radiation means 36 so as to concentrate the radiant energy on the plants supported by inert material 30.

A pump means 40 is mounted in housing means 11. In this embodiment, pump means 40 includes an impeller 41 and a motor 42. Pump motor 42 is mounted upon electrical assembly 35 by means of a bracket 43. An elongated, electrically nonconducting shaft 44 connects motor means 42 to impeller 41 located in channel 18. As illustrated in FIGURE 1, shaft 44 passes through passage 29 through opening 16 to channel 18. In this particular embodiment opening 16 is defined as the outlet of pump means 40 and channel 18 is the means for providing fluid communication between outlet 16 of pump means 40 and chamber 21. Suitable bearing means 45 are attached to container 17 to support shaft 44. A fan rotor 46 is attached to shaft 44 contiguous electrical assembly 35 and is encircled by a shroud 47. Fan rotor 46 is effective to draw air into housing means 11 through passages 48 in top portion 13 of housing means 11.

Control means are provided in housing means 11 and includes a timer 50 attached to the electrical assembly 35. A dial 51 is connected to timer 50.

Figure 3:
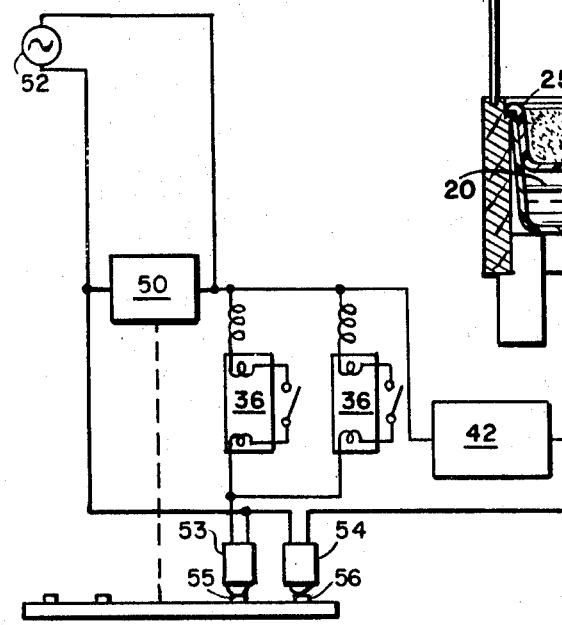
FIGURE 3 is a schematic drawing of the control circuit for the hydroponic apparatus illustrated in FIGURES 1 and 2.

FIGURE 3 illustrates the schematic electrical circuit of the control means of the applicant's hydroponic apparatus. Timer 50 is adapted to be connected to a source of current 52 through suitable leads. Radiation means 36 are adapted to be connected to source of current through suitable leads and a switch means 53. Pump motor 42 is adapted to be connected to source of current through suitable leads and a switch means 53. Pump motor 42 is adapted to be connected to source of current through suitable leads and a switch means 54. Timer 50 is mechanically connected to dial 51 having a radiation cam 55 and a pump motor cam 56 mounted thereon. Radiation cam 55 and pump cam 56 are characterized to activate switches 53 and 54 respectively. Radiation cam 55 in one particular embodiment activates switch 53 so as to energize radiation means 36 and provide approximately 14 hours of radiation in a 24-hour period. Pump motor cam 56 in this embodiment typically activates switch 54 so as to energize pump motor 40 for a five minute cycle approximately three times in a 24-hour period. Thus, the growing cycle of the plants is automatically controlled.

In operation the leads are connected to source of current 52 and timer 50 begins its timing function. As radiation cam 55 rotates and activates switch 53, radiation means 36 are energized to provide radiant energy to the plants supported in inert material 30. It is clear that any time period can be selected by merely varying radiation cam 55. When pump cam 56 rotates and activates switch 54, pump motor 40 is energized and rotates shaft 44 and impeller 41. The rotation of impeller 41 is effective to pump nutrient solution 20 through standpipe 26 into the interior surface of growth tray 25 to a predetermined level determined the period of energization of pump means 40 and/or by the length of overflow tube 27. If the solution level rises above tube 27, the solution flows through tube 27 back to chamber 21 so as to maintain the proper solution level. The rotation of shaft 44 also rotates fan rotor 46 so as to draw air into housing means 11 through passages 48. When cam 55 no longer activates switch 53, radiation means 26 are no longer energized. When cam 56 no longer energizes switch 54 motor 42 is no longer energized. However, if impeller 41 is not rotated by motor 42, nutrient solution 20 is free to flow through it in a reverse direction. Because of the elevation of growth tray 25, the solution will thereby flow down through standpipe 26 into chamber 21 until all but a thin film of solution remains in the individual particles of the inert material 30 in growth tray 25. This particular design completely eliminates the need for any valving whatsoever. As nutrient solution 20 drains from growth tray 25 into chamber 21, the air within housing means 11 is drawn through inert material 30 to the plant roots so as to provide the oxygen necessary for growth. The growth cycle of the plants is thereby automatically controlled by the applicant's hydroponic apparatus.

Referring now to FIGURES 4 and 5, the second embodiment of the applicant's unique hydroponic apparatus is disclosed. Like elements are identified by the same reference numerals as utilized in FIGURES 1 and 2. Hydroponic apparatus 10 includes housing means 11 comprising a base portion 12, a top portion 13, and a glass central portion 14. Legs 15 support housing means 11.

The means defining nutrient storage chamber 21 includes a solution container 17 positioned within base portion 12 of housing means 11. A drain 19 is provided in the bottom of solution container 17. A growth tray 25 is positioned within base portion 12 of housing means 11 and fits partially into solution container 17. The peripheral edges of growth tray 25 are sealed to solution container 17. The exterior surface 61 of growth tray 25 is spaced apart from the interior surface 62 of solution container 17 so as to form nutrient storage chamber 21 therebetween. Two standpipes or passageways 26 extend from growth tray 25 into chamber 21 and are spaced apart from interior surface 62 of solution container 17. The slight depression 63 is contained in solution container 17 opposite standpipes 26. As will be explained hereinafter this allows substantially all of the nutrient solution to be pumped out of chamber 21. Standpipes 26 are in fluid communication with chamber 21 and with the interior surface 64 of growth tray 25. An inlet passage 29 is provided for chamber 21.

An inert material 30 substantially fills the interior surface 64 of growth tray 25. Inert material 30 is prevented from falling into chamber 21 by means of filter material 65. A nutrient solution 20 partially fills chamber 21.

A sheet metal electrical assembly 35 is attached to top portion 113 of housing means 11. A pair of radiation means 36 are mounted on electrical assembly 35. Radiation means 36 may be fluorescent type lights which emit light of a desirable color spectra. Of course, the hydroponic apparatus may be operated without radiation means 36.

A pump means is mounted in housing means 11. In this embodiment, pump means 40 comprises an air pump 71 driven by suitable electrical means (not shown). Pump means 40 includes an outlet conduit 72. Pump means 40 is mounted on an electrical assembly 35 by suitable means (not shown). Outlet conduit 72 of pump means 40 is connected to inlet passage 29 of chamber 21 by means of flexible tubing 73. Tubing 73 is the typical transparent plastic type which is detachably secured to inlet passage 29 so that it can be removed to allow a means defining chamber 21 to be removed from housing means 11. In the particular embodiment illustrated in FIGURES 4 and 5, a bypass valve 74 is illustrated in fluid communication with tubing 73. Bypass valve 74 is the electrically operated type wherein it is closed when it is connected to a suitable source of current. Bypass valve 74 is vented to the atmosphere. Bypass valve 74, pump means 40 and timer 50 are all connected to a suitable source of current (not shown). Bypass valve 74 can also be one of various other types of valves such as a restrictor valve (orifice) vented to the atmosphere. It should be pointed out that bypass valve 74 is not necessary to the operation of the hydroponic apparatus and can be eliminated by shaping the outlet conduit 72 of pump means 40.

The timer 50 and dial 51 are attached to electrical assembly 35. The electrical circuit of the applicant's hydroponic apparatus has already been explained with reference to FIGURE 3 and need not be repeated.

In operation, pump means 40 is energized as explained hereinbefore pumps high pressure air out through outlet conduit 72 through tubing 73 in inlet passage 29 to chamber 21. The high pressure air being forced into chamber 21 forces nutrient solution 20 to be forced up through standpipes 26 into the interior surface 64 of growth tray 25 flooding inert material 30 and immersing the roots of plants therein. Pump means 40 is energized for a period of five minutes so as to force substantially all of the nutrient solution from chamber 21 into the growth tray 25. The only nutrient solution remaining in chamber 21 is a small amount contained in depressions 63. This controls the level of the nutrient solution in growth tray or supporting means 25. When pump means 40 is deenergized, chamber 21 is vented to the atmosphere through the means providing fluid communication between it and outlet 72, that is, inlet passage 29 and tubing 73. If bypass valve 74 is utilized it will be closed when pump means 40 is energized and vented to the atmosphere when pump means 40 is deenergized. Because of the elevation of growth tray 25 the nutrient solution 20 will flow down through the means providing fluid communication between chamber 21 and interior surface 64, that is, standpipes 26. The solution flows into chamber 21 until all but a thin film of solution remains on the individual particles of the inert material 30. As nutrient solution 20 drains from growth tray 25 into chamber 21, the air within housing means 11 is drawn through inert material 30 to the plant roots so as to provide the oxygen necessary for growth. The radiation means are operated as previously described herein. Thus, the applicant has provided a unique hydroponic apparatus which automatically controls the growth cycle of plants positioned therein.

While I have shown and described the specific embodiments of this invention, further modification and improvements will occur to those skilled in the art. It is desired to be understood, therefore, that this invention is not limited to the particular form shown.

I claim:
1. A hydroponic apparatus comprising:
   housing means including a base portion, a top portion and a central portion, said central portion being transparent in part;
   means defining a storage chamber in said base portion of said housing means, said storage chamber adapted to contain a nutrient solution;
   supporting means in said base portion of said housing adapted to support plants therein;
   means for providing fluid communication between said chamber and said supporting means;
   pump means a portion of which is mounted in said top portion of said housing means, said pump means having an outlet;
   means for providing fluid communication between said outlet of said pump means and said storage chamber;
   radiation means mounted in said top portion of said housing means; and
   control means mounted in said top portion of said housing means for controlling the operation of said pump means and said radiation means, said control means being completely isolated from the nutrient solution.

2. A hydroponic apparatus as set forth in claim 1 wherein said pump means comprises an air pump, said air pump being effective to alternately force the nutrient solution from said storage chamber to said supporting means and allow the nutrient solution to flow from said supporting means to said chamber.

3. A hydroponic apparatus as set forth in claim 1 wherein said pump means comprises an impeller pump, said impeller pump being effective to alternately force the nutrient solution from said storage chamber to said supporting means and allow the nutrient solution to flow from said supporting means to said chamber.

4. A hydroponic apparatus as set forth in claim 1 wherein said means for providing fluid communication between said outlet of said pump means and said chamber includes a bypass valve.

5. A hydroponic apparatus comprising:
   housing means including a base portion, a top portion and a central portion;
   a solution container positioned within said base portion of said housing means and adapted to contain a nutrient solution;
   a growth tray positioned within said solution container, said growth tray having an interior surface thereon adapted to contain an inert material for supporting plant roots therein, said solution container and said growth tray cooperating to form a nutrient storage chamber therebetween;
   passage means providing fluid communication between said chamber and said interior surface of said growth tray;
   pump means positioned in said top portion of said housing means, said pump means including an outlet;
   means connecting said outlet of said pump means to said chamber;
   radiation means mounted in said top portion of said housing means; and
   means for controlling the operation of said pump means and said radiation means, said means for controlling being mounted in said top portion of said housing means so as to isolate the controls from the nutrient solution, said pump means being operable to pump the nutrient solution from said chamber through said passageway and into said interior surface of said growth tray so as to immerse the inert material and plant roots located therein, the deenergization of said pump means allowing all of the nutrient solution to return to said storage chamber.

6. A hydroponic apparatus as set forth in claim 5 wherein said pump means comprises an air pump.

7. A hydroponic apparatus as set forth in claim 5 further characterized by having said central portion of said housing means fabricated in part with transparent materials.

References Cited

UNITED STATES PATENTS

| 2,928,211 | 3/1960 | Martin. |
| 2,983,076 | 5/1961 | Merrill. |
| 3,323,253 | 6/1967 | Robins _____ 47—1.2 |

ROBERT E. BAGWILL, *Primary Examiner.*

U.S. Cl. X.R.

47—38